United States Patent
Miyazaki

(10) Patent No.: US 12,427,807 B2
(45) Date of Patent: Sep. 30, 2025

(54) TIRE

(71) Applicant: SUMITOMO RUBBER INDUSTRIES, LTD., Hyogo (JP)

(72) Inventor: Tatsuya Miyazaki, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 734 days.

(21) Appl. No.: 17/253,210

(22) PCT Filed: Mar. 22, 2019

(86) PCT No.: PCT/JP2019/012169
§ 371 (c)(1),
(2) Date: Dec. 17, 2020

(87) PCT Pub. No.: WO2020/003655
PCT Pub. Date: Jan. 2, 2020

(65) Prior Publication Data
US 2021/0268836 A1    Sep. 2, 2021

(30) Foreign Application Priority Data
Jun. 27, 2018  (JP) ................. 2018-122458

(51) Int. Cl.
*B60C 11/12*    (2006.01)
*B60C 1/00*    (2006.01)
(Continued)

(52) U.S. Cl.
CPC ........ *B60C 1/0016* (2013.01); *B60C 11/1218* (2013.01); *B60C 11/1281* (2013.01);
(Continued)

(58) Field of Classification Search
CPC ............. B60C 11/0016; B60C 11/1218; B60C 2011/0025; B60C 1/0016; B60C 1/1218; C08L 91/06
See application file for complete search history.

(56) References Cited

U.S. PATENT DOCUMENTS

| | | | |
|---|---|---|---|
| 5,025,059 A * | 6/1991 | Mouri | .................. C08F 136/06 524/495 |
| 8,915,273 B2 * | 12/2014 | Sakamoto | ........... B60C 11/1323 152/DIG. 3 |

(Continued)

FOREIGN PATENT DOCUMENTS

| | | |
|---|---|---|
| CN | 103712999 | 4/2014 |
| CN | 104024002 | 9/2014 |

(Continued)

OTHER PUBLICATIONS

English machine translation of JP-2017206194-A (Year: 2017).*

(Continued)

*Primary Examiner* — Robert C Dye
(74) *Attorney, Agent, or Firm* — GREENBLUM & BERNSTEIN, P.L.C.

(57) ABSTRACT

An object of the present invention is to provide a tire having a good mold releasability even though the tire has a sipe with a complicated shape such as a three-dimensional shape and with abrasion resistance and wet grip performance maintained or improved. The tire comprises a cap tread, wherein the cap tread is composed of a rubber composition comprising 0.20 parts by mass or more of C40-C70 branched alkane based on 100 parts by mass of a rubber component and having 0.16 or less of tan δ at 30° C., and wherein the cap tread has a sipe with a three-dimensional shape or a sipe with a portion of a maximum cross-sectional area inside a surface (Continued)

of the tread, and wherein the maximum cross-sectional area is 1.1 times or more the minimum cross-sectional area.

18 Claims, 4 Drawing Sheets

(51) Int. Cl.
    *C08K 3/04* (2006.01)
    *C08K 3/36* (2006.01)
    *C08L 9/06* (2006.01)
    *C08L 91/06* (2006.01)
    *C08K 3/011* (2018.01)
(52) U.S. Cl.
    CPC .................. *C08K 3/04* (2013.01); *C08K 3/36* (2013.01); *C08L 9/06* (2013.01); *C08L 91/06* (2013.01); *C08K 3/011* (2018.01)

(56) References Cited

U.S. PATENT DOCUMENTS

| | | | | |
|---|---|---|---|---|
| 2002/0170643 | A1* | 11/2002 | Kuze | B60C 11/12 152/209.5 |
| 2007/0095447 | A1 | 5/2007 | Nguyen et al. | |
| 2010/0300626 | A1 | 12/2010 | Nguyen et al. | |
| 2012/0157568 | A1* | 6/2012 | Sandstrom | C08L 9/06 524/502 |
| 2013/0000805 | A1 | 1/2013 | Oodaira | |
| 2014/0099723 | A1 | 4/2014 | Kaneko et al. | |
| 2014/0261936 | A1 | 9/2014 | Iwamura | |
| 2014/0299245 | A1 | 10/2014 | Kaji | |
| 2015/0087745 | A1* | 3/2015 | Chekanov | C08L 9/00 523/156 |
| 2016/0130426 | A1 | 5/2016 | Miyazaki et al. | |
| 2016/0304706 | A1 | 10/2016 | Kamada | |
| 2017/0029605 | A1* | 2/2017 | Masumoto | C08L 9/00 |
| 2018/0264772 | A1 | 9/2018 | Sugihara | |
| 2018/0319960 | A1 | 11/2018 | Saji et al. | |

FOREIGN PATENT DOCUMENTS

| | | | |
|---|---|---|---|
| CN | 104354538 | | 2/2015 |
| CN | 104773039 | | 7/2015 |
| CN | 106046434 | | 10/2016 |
| CN | 103 242 578 | B | 4/2017 |
| EP | 0738613 | A1 * | 10/1996 |
| EP | 1 782 970 | A1 | 5/2007 |
| EP | 2 777 952 | A2 | 9/2014 |
| EP | 3 260 305 | A1 | 12/2017 |
| JP | 11-199711 | | 7/1999 |
| JP | 11199711 | A * | 7/1999 |
| JP | 2004-307798 | | 11/2004 |
| JP | 2014-177237 | | 9/2014 |
| JP | 2015-013955 | | 1/2015 |
| JP | 2016-204413 | | 12/2016 |
| JP | 2017-101159 | | 6/2017 |
| JP | 2017206194 | A * | 11/2017 |
| WO | 2017/077712 | | 5/2017 |

OTHER PUBLICATIONS

English machine translation of JP-11199711-A. (Year: 1999).*
"What is a Wax?" [online]. A.S. Harrison & Co., [retrieved on Dec. 17, 2023]. Retrieved from the Internet: <URL:https://asharrison.com.au/what-is-a-wax/> (Year: 2023).*
"Microcrystalline Wax Definition" [online]. Keyton Energy. [retrieved on Dec. 17, 2023]. Retrieved from the Internet: <URL:https://keytonenergy.com/microcrystalline-wax/> (Year: 2023).*
EESR issued in EP Patent Application No. 19825244.7 Feb. 9, 2022.
ISR issued in International Patent Application No. PCT/JP2019/ 012169, Jun. 18, 2019, English translation.
IPRP issued in International Patent Application No. PCT/JP2019/ 012169, Dec. 29, 2020, English translation.
Office Action issued in Chinese Patent Application No. 201980036878. 1, May 7, 2021, English translation.

* cited by examiner (A)

(B)

(A)

(B)

(A)

(B)

(A)

(B)

TIRE

TECHNICAL FIELD

The present invention relates to a tire having a good mold releasability even though the tire has a sipe with a complicated shape such as a three-dimensional shape.

BACKGROUND ART

In special-purpose tires such as a studless tire, in order to improve gripping force and drainage performance, a sipe that is a thin groove with a width of about 0.1 to 3.0 mm may be provided to a tread rubber in addition to a circumferential groove (rib) and a vertical groove (lug).

The sipe usually has a two-dimensional shape such as a wavy shape or zigzag shape on a ground contact surface of a tire in order to obtain effects of improvement in grip performance and drainage performance by an edge effect. However, in recent years, for further improvement in a tire performance, there has been a demand to have a complicated curved surface such as a three-dimensional shape, that is, to make the sipe shape three-dimensional or complicated (e.g., Patent Document 1).

PRIOR ART DOCUMENT

Patent Document

Patent Document 1: JP 2014-177237 A

SUMMARY OF THE INVENTION

Problem to be Solved by the Invention

However, when the shape of the blade for forming the sipe becomes complicated, problems occur such that it becomes difficult to take out (demold) the tire from the mold, which deteriorates productivity, and in demolding, the rubber near the blade is chipped.

As a compounding agent for improving mold releasability, a fatty acid, a fatty acid amide, a fatty acid amide ester, a fatty acid metal salt, and a mixture thereof are known. However, the amount of these compounding agents used is limited from the viewpoint of ensuring abrasion resistance and wet grip performance.

An object of the present invention is to provide a tire having a good mold releasability even though the tire has a sipe with a complicated shape such as a three-dimensional shape and with abrasion resistance and wet grip performance maintained or improved.

Means to Solve the Problem

As a result of intensive studies, the present inventor has found that the above-described problems can be solved by comprising a predetermined amount of branched higher alkane in a rubber component, and completed the present invention.

That is, the present invention relates to

[1] A tire comprising a cap tread, wherein the cap tread is composed of a rubber composition comprising 0.20 parts by mass or more of C40-C70 branched alkane based on 100 parts by mass of a rubber component and having 0.16 or less of tan δ at 30° C., and wherein the cap tread has a sipe with a three-dimensional shape or a sipe with a portion of a maximum cross-sectional area inside a surface of the tread, and wherein the maximum cross-sectional area is 1.1 times or more the minimum cross-sectional area,

[2] The tire of the above [1], wherein the tan δ at 30° C. of the rubber composition is 0.14 or less of tan δ at 30° C.,

[3] The tire of the above [1] or [2], wherein the rubber composition comprises 0.40 parts by mass or more of C40-C70 branched alkane, and

[4] The tire of any of the above [1] to [3], wherein the total content of silica and carbon black in the rubber composition is 110 parts by mass or less.

Effects of the Invention

The tire comprising a cap tread having a sipe with a three-dimensional shape or the like according to the present invention has a good mold releasability and maintained or improved abrasion resistance and wet grip performance. Furthermore, in a preferred aspect, fuel efficiency of the tire can be also improved.

EMBODIMENT FOR CARRYING OUT THE INVENTION

A tire according to an embodiment of the present invention comprises a cap tread, wherein the cap tread is composed of a rubber composition comprising 0.20 parts by mass or more of C40-C70 branched alkane based on 100 parts by mass of a rubber component and having 0.16 or less of tan δ at 30° C., and wherein the cap tread has a sipe with a three-dimensional shape or a sipe with a portion of a maximum cross-sectional area inside a surface of the tread, and wherein the maximum cross-sectional area is 1.1 times or more the minimum cross-sectional area. Each component will be described below.

<Sipe>

The "sipe" in the present specification refers to a fine groove formed in a tread part of a tire and having a very narrow width dividing tread members. The sipe usually has a width of 0.1 to 3.0 mm. The width of the sipe is a width of which the sipe completely closes at a ground contact surface of the tire.

A "radial" and "radially" in the present specification mean a direction radially toward or away from an axis of rotation of a tire.

The "cross-sectional area of a sipe" in the present specification means a sum of cross-sectional areas at any position more inside (radial direction) than a tread surface.

When a sipe with a two-dimensional shape in which a sipe shape in a radial direction of a tire is in a straight line is used, the deformation of the rubber does not stop until a sufficient reaction force is obtained, and there is little interference with adjacent rubber blocks. On the other hand, when a sipe with a three-dimensional shape sipe having a bending shape also in a radial direction is used, even sipes having the same thickness due to a vector decomposition of an amount of rubber deformation can stop the block deformation with a small amount of deformation. In this way, the adjacent blocks support each other to suppress collapse of the blocks, so that the rigidity of the blocks improves and the gripping force improves during driving and braking. Furthermore, since the blocks are prevented from rising from the road surface, the actual ground contact area with the road surface increases and the edge effect improves. Moreover, since the deformation of the sipe is suppressed, the drainage performance also improves.

The sipe having the three-dimensional shape in the present embodiment is not particularly limited, as long as it has a two-dimensional shape such as a wavy or zigzag shape on the ground contact surface of the tire and has a bending shape such as a bent or curved line, not a straight line, in the radial direction of the tire. Specific examples of such sipe with the three-dimensional shape include, for example, a Miura folding sipe, a scrum sipe, a Z sipe, a pyramid sipe, a flask type sipe, and the like.

Figure 5:
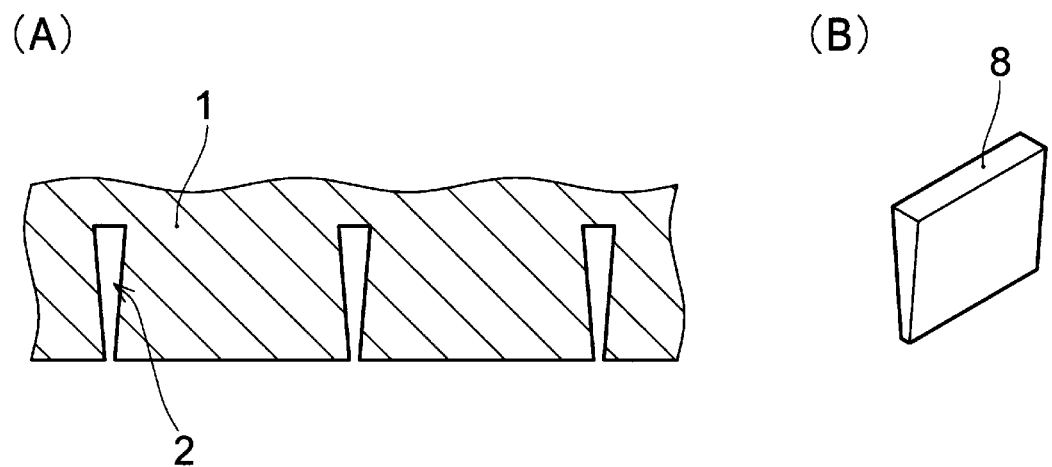
FIG. 5 is a schematic view of a cross section of the "sipe which has a portion to be a maximum cross-sectional area more inside than the tread surface in the sipe, the maximum cross-sectional area being 1.1 times or more the minimum cross-sectional area" (A) and a perspective view of a blade of a vulcanization mold (B).
Figure 6:
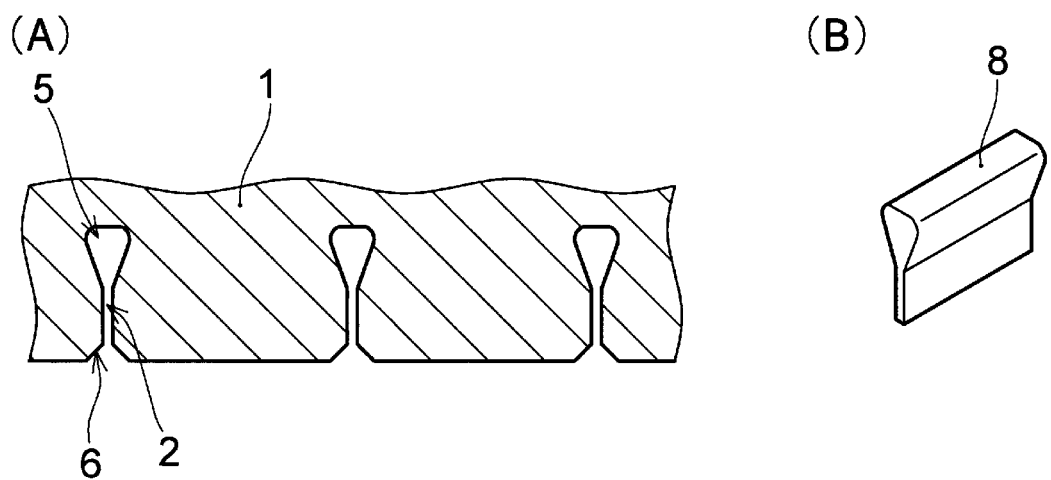
FIG. 6 is a schematic view of a cross section of the "sipe which has a portion to be a maximum cross-sectional area more inside than the tread surface in the sipe, the maximum cross-sectional area being 1.1 times or more the minimum cross-sectional area" (A) and a perspective view of a blade of a vulcanization mold (B).
Figure 7:
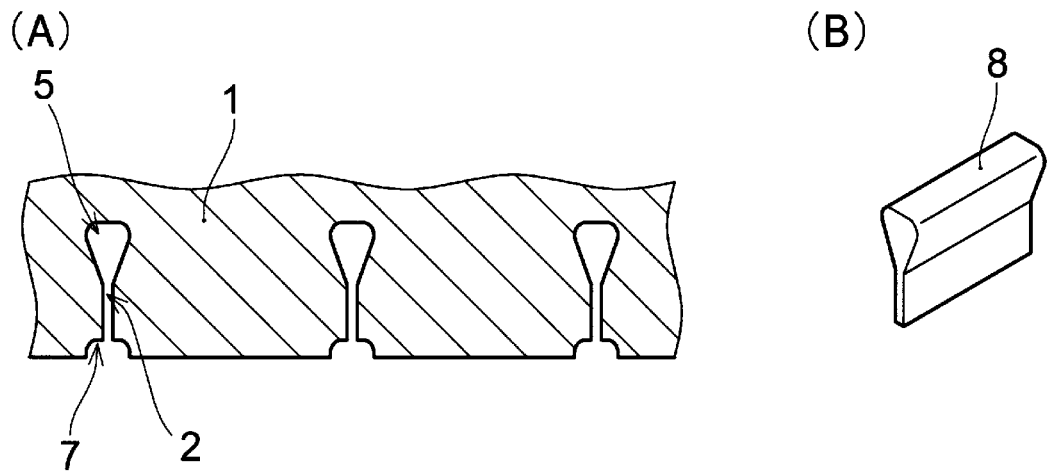
FIG. 7 is a schematic view of a cross section of the "sipe which has a portion to be a maximum cross-sectional area more inside than the tread surface in the sipe, the maximum cross-sectional area being 1.1 times or more the minimum cross-sectional area" (A) and a perspective view of a blade of a vulcanization mold (B).

Examples of the tire according to the present embodiment also include a tire having a sipe which has a portion to be a maximum cross-sectional area more inside (radial direction) than the tread surface in the sipe, the maximum cross-sectional area being 1.1 times or more the minimum cross-sectional area, as an appropriate embodiment, from the viewpoint of ensuring wet grip performance and drainage performance from a new article period to an abrasion intermediate period. Examples of the shape of such sipe in the radial direction include, but not particularly limited to, for example, those shown in FIGS. 5 to 7. Such sipe has a portion to be a maximum width more inside (radial direction) than the tread surface.

Since the sipe is a groove and specifically has no shape, the shapes shown in the cross-sectional views of the sipes ((A) of FIGS. 2 to 7) correspond to those of the blades of the vulcanization molds for forming the sipes ((B) of FIGS. 2 to 7). That is, a fine structure portion of the sipe can be formed by forming the blade into a desired shape. Since the blade for forming the sipe with the complicated shape as described above is easily damaged, it is attached to the vulcanization mold as a replaceable jig. In addition, recesses (for example, a trimming 6, a shallow groove 7, etc.) that may be formed on the tread surface are formed by a casting process of the vulcanization mold, not by the shape of the blade.

<Rubber Component>

Examples of the rubber component used in the present embodiment include, for example, diene-based rubbers such as a natural rubber (NR), an isoprene rubber (IR), a butadiene rubber (BR), a styrene butadiene rubber (SBR), a styrene isoprene butadiene rubber (SIBR), an ethylene propylene diene rubber (EPDM), a chloroprene rubber (CR), and an acrylonitrile butadiene rubber (NBR). Among them, the BR and SBR are preferable since they provide a good balance of grip performance and abrasion resistance. These rubber components may be used alone, or two or more thereof may be used in combination.

(BR)

The BR is not particularly limited, and those which are common in the tire industry can be used such as, for example, a BR having a content of cis-1,4 bond of less than 50% (a low cis BR), a BR having a content of cis 1,4 bond of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). Among them, at least one selected from the group consisting of the rare-earth-based BR and the low cis modified BR is preferably used.

Examples of the high cis BR include, for example, BR1220 manufactured by Zeon Corporation, BR130B, BR150B, BR150L manufactured by Ube Industries, Ltd., and BR730 manufactured by JSR Corporation, and the like. The low-temperature property and abrasion resistance can be improved by containing the high cis BR. Examples of the rare-earth-based BR include, for example, BUNA-CB25 manufactured by LANXESS, and the like.

The rare-earth-based BR is a butadiene rubber synthesized using a rare-earth element-based catalyst. The rare-earth-based BR has a high cis content and a low vinyl content. The rare-earth-based BR is not particularly limited, and those commonly used in the tire manufacturing can be used.

Examples of the rare-earth element-based catalyst used in synthesis of the rare-earth based BR include, but not particularly limited to, those including a lanthanum series rare-earth element compound, an organic aluminum compound, an aluminoxane, a halogen-containing compound, and a Lewis base as necessary, and the like. Among them, a neodymium (Nd)-based catalyst using a Nd-containing compound as a lanthanum series rare-earth element compound is particularly preferable since it has good abrasion resistance and heat generation performance. The rare-earth element-based catalyst may be used alone, or two or more thereof may be used in combination.

The weight-average molecular weight (Mw) of the rare-earth-based BR is preferably 200,000 or more, and more preferably 250,000 or more, from the viewpoints of abrasion resistance and fuel efficiency. Furthermore, it is preferably 900,000 or less, and more preferably 600,000 or less, from the viewpoint of processability.

The cis-1,4 bond content of the rare-earth-based BR is preferably 90% by mass or more, more preferably 93% by mass or more, and further preferably 95% by mass or more. When the cis 1,4 bond content is within the above-described ranges, the breaking elongation and abrasion resistance of the rubber composition further improve.

The vinyl content of the rare-earth-based BR is preferably 1.8% by mass or less, more preferably 1.0% by mass or less, and further preferably 0.5% by mass or less. When the vinyl content of the rare-earth-based BR is within the above-described ranges, the breaking elongation and abrasion resistance of the rubber composition further improve. In addition, in the present embodiment, any of the vinyl content (1,2-bond butadiene unit amount) and cis-1,4 bond content may be measured by infrared absorption spectrometry.

The content of the rare-earth-based BR when contained in 100% by mass of the rubber component is preferably 5% by mass or more, more preferably 10% by mass or more, and further preferably 12% by mass or more. When it is less than 5% by mass, abrasion resistance and breaking elongation may not be sufficiently obtained. The content is preferably 40% by mass or less, more preferably 35% by mass or less, and further preferably 30% by mass or less. When it exceeds 40% by mass, sufficient fuel efficiency and abrasion resistance may not be obtained.

Examples of the SPB-containing BR include those in which 1,2-syndiotactic polybutadiene crystal is dispersed after chemically bonded with BR, but not those in which the crystal is simply dispersed in the BR. Examples of Such SPB-containing BR include VCR-303, VCR-412, VCR-617 manufactured by Ube Industries, Ltd, and the like.

Examples of the modified BR include those obtained by adding a tin compound after polymerizing 1,3-butadiene by a lithium initiator and further with which the end of the modified BR molecule is bonded by tin-carbon bond (a tin-modified BR), a butadiene rubber having a condensed alkoxysilane compound at its active end (a silica-modified BR), and the like. Examples of such modified BR include, for example, BR1250H (a tin-modified BR) manufactured by Zeon Corporation, a S-modified polymer (a silica-modified BR) manufactured by Sumitomo Chemical Co., Ltd., and the like.

As the modified BR, a modified BR having a cis content of 50% by mass or less (hereinafter, also referred to as a modified low cis BR) is appropriately used. By compounding the modified low cis BR, the dispersibility of silica can be increased and the wet grip performance and fuel efficiency can be improved.

Examples of the modified low cis BR include a BR having a low cis content modified with a compound having a functional group including at least one atom selected from the group consisting of nitrogen, oxygen and silicon, for example, a terminal-modified low cis BR modified with a compound having the above-described functional group (a modifying agent) at least one terminal thereof, a main chain-modified low cis BR having the above-described functional group at the main chain, a main chain/terminal-modified low cis BR having the above-described functional group at the main chain and terminal (e.g., a main chain/terminal-modified low cis BR having the above-described functional group at the main chain and modified with the above-described modifying agent at least one terminal thereof), and the like. Among them, the terminal-modified low cis BR is preferable.

Examples of the functional group include, for example, an amino group, an amide group, an alkoxysilyl group, an isocyanate group, an imino group, an imidazole group, a urea group, an ether group, a carbonyl group, an oxycarbonyl group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, an epoxy group, and the like. In addition, these functional groups may have a substituent. Among them, primary, secondary, and tertiary amino groups (in particular, a glycidylamino group), an epoxy group, a hydroxyl group, an alkoxy group (preferably a C1-C6 alkoxy group), and an alkoxysilyl group (preferably a C1-C6 alkoxysilyl group) are preferable because of their high effect of improvement in fuel efficiency.

As the terminal-modified low cis BR, a silica-modified butadiene rubber having a low cis content (a S-modified low cis BR) modified with a compound represented by the following formula (1) is preferable:

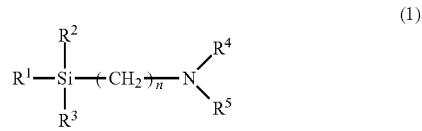

wherein $R^1$, $R^2$, and $R^3$ are the same or different and each represent an alkyl group, an alkoxy group, a silyloxy group, an acetal group, a carboxyl group (—COOH), a mercapto group (—SH) or a derivative thereof. $R^4$ and $R^5$ are the same or different and each represents a hydrogen atom or an alkyl group. $R^4$ and $R^5$ may bond with each other to form a ring structure with a nitrogen atom. n represents an integer.

Examples of the above-described S-modified low cis BR include those described in JP 2010-111753 A, etc.

In the formula (1), the alkoxy group is appropriate as $R^1$, $R^2$ and $R^3$ since it can obtain good fuel efficiency and durability (preferably a C1-C8 alkoxy group, and more preferably a C1-C4 alkoxy group). As $R^4$ and $R^5$, the alkyl group is appropriate (preferably a C1-C3 alkyl group). n is preferably 1 to 5, more preferably 2 to 4, and further preferably 3. Furthermore, when $R^4$ and $R^5$ bond with each other to form a ring structure with a nitrogen atom, a 4 to 8-membered ring is preferable. In addition, the alkoxy group also includes a cycloalkoxy group (a cyclohexyloxy group and the like) and an aryloxy group (a phenoxy group, a benzyloxy group and the like). Effects of the present invention can be properly obtained by using preferred compounds.

Specific examples of the compound represented by the formula (1) include 2-dimethylaminoethyltrimethoxysilane, 3-dimethylaminopropyltrimethoxysilane, 2-dimethylaminoethyltriethoxysilane, and 3-dimethylaminopropyltriethoxysilane, 2-diethylaminoethyltrimethoxysilane, 3-diethylaminopropyltrimethoxysilane, 2-diethylaminoethyltriethoxysilane, 3-diethylaminopropyltriethoxysilane, and the like. Among them, 3-dimethylaminopropyltrimethoxysilane, 3-dimethylaminopropyltriethoxysilane, and 3-diethylaminopropyltrimethoxysilane are preferable since they can well improve the above-described performances. They may be used alone, or two or more thereof may be used in combination.

As a method of modifying a butadiene rubber with the compound (modifying agent) represented by the formula (1), conventionally known methods such as methods described in JP H6-53768 A and JP H6-57767 A can be used. For example, examples of the method include those of allowing for modification by bringing a butadiene rubber into contact with the compound, specifically, preparing a butadiene rubber by anionic polymerization, then adding a predetermined amount of the compound to the rubber solution, and reacting the polymer terminal (active terminal) of the butadiene rubber with the compound.

Furthermore, as the terminal-modified low cis BR, a modified butadiene rubber having a low cis content modified with a low molecular compound containing a glycidylamino group in the molecule can also be appropriately used, for example, a modified butadiene rubber having a low cis content modified with a low molecular compound represented by the following formula:

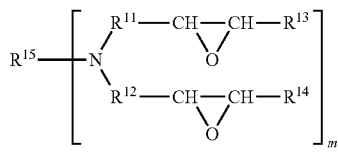

wherein, $R^{11}$ and $R^{12}$ are the same or different and each represents a C1-C10 hydrocarbon group. The hydrocarbon group may have at least one group selected from the group consisting of ether and tertiary amine. $R^{13}$ and $R^{14}$ are the same or different and each represents a hydrogen atom or a C1-C20 hydrocarbon group. The hydrocarbon group may have at least one group selected from the group consisting of ether and tertiary amine. $R^{15}$ represents a C1-C20 hydrocarbon group. The hydrocarbon group may have at least one group selected from the group consisting of ether, tertiary amine, epoxy, carbonyl, and halogen. m represents an integer of 1 to 6.

$R^{11}$ and $R^{12}$ are preferably C1-C10 alkylene groups (preferably C1-C3). $R^{13}$ and $R^{14}$ are preferably hydrogen atoms. Example of $R^{15}$ includes a C3-C20 hydrocarbon group (preferably C6-C10, and more preferably C8), preferably a cycloalkyl group or a cycloalkylene group represented by the following formula, and more preferably a cycloalkylene group.

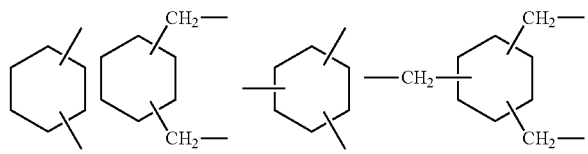

Furthermore, m is preferably 2 to 3. As a compound represented by the above-described formula, for example, tetraglycidylmetaxylenediamine, tetraglycidylaminodiphenylmethane, tetraglycidyl-p-phenylenediamine, diglycidylaminomethylcyclohexane, tetraglycidyl-1,3-bisaminomethylcyclohexane and the like are appropriately used.

The cis content of the modified low cis BR is preferably 50% by mass or less, more preferably 45% by mass or less, and further preferably 40% by mass or less, from the viewpoints of improving the addition rate of the silica-modified group to the polymer and facilitating interaction with silica. When it exceeds 50% by mass, the above-described effects tend not to be achieved. Furthermore, it is preferably 10% by mass or more, and more preferably 20% by mass or more, from the viewpoints of abrasion resistance and breaking elongation.

The vinyl content of the modified low cis BR is preferably 35% by mass or less, and more preferably 30% by mass or less, from the viewpoints of fuel efficiency and breaking elongation. The vinyl content is preferably 1% by mass or more, and more preferably 5% by mass or more.

The weight-average molecular weight (Mw) of the modified low cis BR is preferably 200,000 or more, and more preferably 400,000 or more, from the viewpoints of abrasion resistance and breaking elongation. Furthermore, it is preferably 900,000 or less, and more preferably 700,000 or less, from the viewpoints of processability and dispersibility.

In addition, in the present specification, the cis content (cis-1,4-bond butadiene unit amount) and the vinyl content (1,2-bond butadiene unit amount) can be measured by infrared absorption spectrometry. Furthermore, the weight-average molecular weight (Mw) and the number-average molecular weight (Mn) can be calculated in terms of a standard polystyrene based on measurement values obtained by a gel permeation chromatography (GPC) (GPC-8000 Series manufactured by Tosoh Corporation, detector: differential refractometer, column: TSKGEL SUPERMULTIPORE HZ-M manufactured by Tosoh Corporation).

The content of the modified low cis BR in 100% by mass of the rubber component is preferably 5% by mass or more, more preferably 10% by mass or more, and further preferably 15% by mass or more, from the viewpoints of fuel efficiency and abrasion resistance. Furthermore, it is preferably 40% by mass or less, more preferably 30% by mass or less, and further preferably 20% by mass or less, from the viewpoints of abrasion resistance and breaking elongation.

Any one of the above-listed BRs may be used alone, or two or more thereof may be used in combination.

The total content of the BRs in the rubber component is preferably 5% by mass or more, more preferably 10% by mass or more, and further preferably 15% by mass or more, from the viewpoint of abrasion resistance. Furthermore, it is preferably 40% by mass or less, more preferably 35% by mass or less, and further preferably 30% by mass or less, from the viewpoint of wet grip performance.

(SBR)

Examples of the SBR include, but not particularly limited to, an emulsion-polymerized SBR (E-SBR), a solution-polymerized SBR (S-SBR), a silica-modified styrene-butadiene rubber modified with a compound having interaction with silica (a silica-modified SBR), and the like. Among them, the E-SBR and the silica-modified SBR are preferable. The E-SBR has many high molecular weight components and has good abrasion resistance and breaking elongation. Furthermore, since the silica-modified SBR has a strong interaction with silica, it can well disperse silica and improve fuel efficiency and abrasion resistance.

The E-SBR is not particularly limited, and those commonly used in the tire industry can be used.

As the silica-modified SBR, those using a styrene-butadiene rubber as a substitute for the butadiene rubber which is a skeleton component of the silica-modified BR can be used. Among them, as the silica-modified SBR, a modified butadiene rubber modified with the compound represented by the above-described formula (1) (S-modified SBR) is preferable, and a S-modified S-SBR having the polymer terminal (active terminal) of the solution-polymerized styrene-butadiene rubber (S-SBR) modified with the compound represented by the above-described formula (1) (a modified SBR described in JP 2010-111753 A) is more preferable.

The amount of bonded styrene in the silica-modified SBR is preferably 15% by mass or more, and more preferably 23% by mass or more, from the viewpoint of wet grip performance. Furthermore, it is preferably 40% by mass or less, more preferably 35% by mass or less, and further preferably 30% by mass or less, from the viewpoint of fuel efficiency. In addition, it is calculated by $^1$H-NMR measurement.

The total content of the silica-modified SBRs in 100% by mass of the rubber component is preferably 60% by mass or more, more preferably 65% by mass or more, and further preferably 70% by mass or more, from the viewpoints of wet grip performance and fuel efficiency. Furthermore, it is preferably 95% by mass or less, more preferably 90% by mass or less, and further preferably 85% by mass or less, from the viewpoints of abrasion resistance and fuel efficiency.

The total content of the SBRs in 100% by mass of the rubber component is preferably 60% by mass or more, more preferably 65% by mass or more, and further preferably 70% by mass or more, from the viewpoint of wet grip performance. Furthermore, it is preferably 95% by mass or less, more preferably 90% by mass or less, and further preferably 85% by mass or less.

<Alkane Component>

The rubber composition for a tread according to the present embodiment comprises 0.20 parts by mass or more of C40-C70 branched alkane. Furthermore, it preferably comprises a C45 or more linear alkane and a C20-C32 linear alkane.

(C40-C70 Branched Alkane)

The C40-C70 branched alkane does not bleed unless the ambient temperature is 60° C. or higher. Therefore, when a predetermined amount of such a branched wax is compounded, the rubber composition does not cause whitening even during storage in a warehouse in the summer, and the mold releasability can be improved. Specifically, such a branched wax is considered to instantaneously bleed to the rubber surface at the initial stage of vulcanization and fill the micro irregularities on the mold surface, so that it improves the releasability from the mold. Furthermore, such a branched wax may solidify into a granule on the rubber surface. Therefore, even when such a branched wax is compounded, the rubber composition obtained does not form a hard film, does not deteriorate the initial grip, and does not easily compromise the ozone resistance. Moreover, since a bleeding substance of such a branched wax reaches a temperature of 150 to 190° C. at the time of mold release, it is in a liquid state, and it has a low viscosity on the surface of the mold, and the tire easily comes off from the mold. In addition, in order to well maintain the ozone resistance, a C20-C32 linear alkane and an antioxidant which will be described later may be appropriately compounded. When the branched alkane has 40 or more carbon atoms, the above-described bleeding is likely to occur at the vulcanization temperature (for example, 150 to 200° C.). Furthermore, when the branched alkane has 70 or less carbon atoms, the rubber composition exhibits moderate viscosity, has improved slipperiness between the mold and the tire, and is easily mold-released. Moreover, the rubber composition exhibits moderate film hardness even when the tire is used. In addition, a wax having more than 70 carbon atoms and a molecular weight of more than 1,000 has a high melting point and easily forms a hard film. On the other hand, as described above, the C40-C70 branched alkane according to the present embodiment does not form a hard film and is appropriate for a tire.

A method of setting the content of C40-C70 branched alkane to a specific amount is not particularly limited. By way of an example, the rubber composition may compound a content of the C40-C70 branched alkane into the above-described ranges by, for example, compounding a wax comprising a predetermined amount of C40-C70 branched alkane into the rubber composition. Such wax is not particularly limited. Examples of the wax include those manufactured and sold by Nippon Seiro Co., Ltd., and the like.

The content of C40-C70 branched alkane may be 0.20 parts by mass or more, preferably 0.30 parts by mass or more, more preferably 0.40 parts by mass or more, and further preferably 0.50 parts by mass or more based on 100 parts by mass of the rubber component, since it easily bleeds at high temperature and has a good releasability from the mold of the rubber composition obtained, etc. Furthermore, it is preferably 3.0 parts by mass or less, more preferably 2.5 parts by mass or less, and further preferably 2.0 parts by mass or less, from the viewpoints of good initial grip performance and whitening.

(C45 or More Linear Alkane)

A method of setting the content of C45 or more linear alkane to a specific amount is not particularly limited. By way of an example, the rubber composition may compound a content of C45 or more linear alkane into the above-described ranges by, for example, compounding a wax comprising a predetermined amount of C45 or more linear alkane into the rubber composition. Such wax is not particularly limited. Examples of the wax include those manufactured and sold by Nippon Seiro Co., Ltd., and the like.

The content of C45 or more linear alkane is preferably 1.2 parts by mass or less, more preferably 1.0 part by mass or less, and further preferably 0.90 parts by mass or less based on 100 parts by mass of the rubber component, from the viewpoint of suppressing whitening of the appearance of the rubber composition obtained. Furthermore, it is preferably 0.05 parts by mass or more, more preferably 0.10 parts by mass or more, further preferably 0.15 parts by mass or more, and particularly preferably 0.20 parts by mass or more, from the viewpoint of static ozone cracking performance under a high temperature environment.

(C20-C32 Linear Alkane)

A method of setting the content of C20-C32 linear alkane to a specific amount is not particularly limited. By way of an example, the rubber composition may compound a content of C20-C32 linear alkane into the above-described ranges by, for example, compounding a wax comprising a predetermined amount of C20-C32 linear alkane into the rubber composition. Such wax is not particularly limited. Examples of the wax include those manufactured and sold by Nippon Seiro Co., Ltd., and the like. Even when the linear alkane within this range of mass part is stored in, for example, a warehouse in the summer (under an environment of 35 to 50° C.), etc., it is less likely to bloom and may stay in the rubber composition. Therefore, even when a predetermined amount of the linear alkane having such carbon numbers is contained, the rubber composition is less likely to cause a decrease in initial grip and whitening.

The content of C20-C32 linear alkane is preferably 1.2 parts by mass or less, more preferably 1.0 part by mass or less, and further preferably 0.90 parts by mass or less based on 100 parts by mass of the rubber component, from the viewpoint of good grip performance of the rubber composition obtained. Furthermore, it is preferably 0.05 part by mass or more, more preferably 0.10 part by mass or more, further preferably 0.15 part by mass or more, and particularly preferably 0.20 part by mass or more, from the viewpoint of a good ozone cracking performance of the rubber composition obtained. In addition, the ozone cracking performance may also be improved by increasing the amount of antioxidant (preferably, a phenylenediamine-based antioxidant).

The above-described melting point of the alkane component used as a wax is preferably 40° C. or higher, more preferably 45° C. or higher, and further preferably 50° C. or higher, from the viewpoint of preventing blooming early to consume the wax in a short time. Furthermore, it is preferably 90° C. or lower, and more preferably 85° C. or lower, from the viewpoint of ozone resistance. In addition, the melting point is a peak top temperature when measured using a differential scanning calorimeter (DSC). For example, using a differential scanning calorimeter (Thermo plus DSC8230, manufactured by Rigaku), the temperature can be raised at 5° C./min, and the peak top of the melting obtained can be a melting point.

Examples of the wax include a petroleum-based wax, a natural-based wax, a synthetic wax and the like, and those obtained by purifying or chemically treating a plurality of waxes can also be used. Any one of the above-listed waxes may be used alone, or two or more thereof may be used in combination.

Examples of the petroleum-based wax include a paraffin wax, a microcrystalline wax, and the like. Examples of the natural-based wax include plant waxes such as a candelilla wax, a carnauba wax, a wood wax, a rice wax, and a jojoba wax; animal-based waxes such as beeswax, lanolin, and a whale wax; mineral-based waxes such as ozokerite, ceresin, and petrolactam; and purified products thereof, and the like. Examples of the synthetic wax include a polymer such as ethylene or propylene.

<Resin Component>

The rubber composition for a tread according to the present embodiment may comprise an adhesive resin as a resin component. Examples of the adhesive resin include aromatic hydrocarbon-based resins such as a phenol resin, an alkylphenol resin, a terpene-based resin, a coumarone resin, an indene resin, a coumarone indene resin, a styrene resin, an α-methylstyrene resin, an α-methylstyrene/styrene resin, an acrylic resin, a rosin resin, and a dicyclopentadiene resin (DCPD resin), and aliphatic hydrocarbon-based resins such as a C5 resin, a C8 resin, a C9 resin, and a C5/C9 resin, which are commonly used in the tire industry. Furthermore, these resins may be those obtained by being hydrogenated. Among them, the terpene-based resin, the coumarone indene resin, the α-methylstyrene resin, the rosin resin, and the dicyclopentadiene resin are preferable, and the terpene styrene resin and the α-methylstyrene resin are more preferable. Any one of the above-listed resin components may be used alone, or two or more thereof may be used in combination.

(Terpene-Based Resin)

The terpene-based resin has a lower SP value than other adhesive resins such as an aliphatic-based petroleum resin, an aromatic-based petroleum resin, a phenolic-based resin, a coumarone indene resin, and a rosin-based resins, the value being between the SBR (SP value: 8.9) and the BR (SP value: 8.2), which is preferable from the viewpoint of compatibility with rubber components. Among them, a terpene styrene resin is appropriately used since it is particularly compatible with both the SBR and the BR and sulfur is easily dispersed in the rubber component.

The polyterpene resin is a resin having at least one selected from terpene compounds such as α-pinene, β-pinene, limonene, and dipentene as a raw material. The terpene phenol resin is a resin having the above-described terpene compound and a phenol-based compound as raw materials. The terpene styrene resin is a resin having the above-described terpene compound and a styrene as raw materials. The polyterpene resin and the terpene styrene resin may be hydrogenated resins (a hydrogenated polyterpene resin, a hydrogenated terpene styrene resin). Hydrogenation to the terpene-based resin can be performed by a known method, and a commercially available hydrogenated resin can be used.

Any one of the above-listed terpene-based resins may be used alone, or two or more thereof may be used in combination. In the present embodiment, a commercially available product may be used as the terpene-based resin. Examples of such commercially available products include those manufactured and sold by Yasuhara Chemical Co., Ltd. and the like.

(α-Methylstyrene Resin)

The α-methylstyrene resin means a resin comprising an α-methylstyrene as a main monomer component constituting a backbone (a main chain) of the resin, for example, an α-methylstyrene homopolymer, a copolymer of an α-methylstyrene and styrene, and the like. These α-methylstyrene resins may be used alone, or two or more thereof may be used in combination. In the present embodiment, a commercially available product may be used as the α-methylstyrene resin. Specific examples of such commercially available products include those manufactured and sold by Arizona Chemical Company and the like.

When the rubber composition comprises the adhesive resin, the content thereof is, from the viewpoints of abrasion resistance and initial wet grip performance, preferably 0.1 parts by mass or more, more preferably 0.5 parts by mass or more, and further preferably 1.0 part by mass or more based on 100 parts by mass of the rubber component. Furthermore, it is preferably 20 parts by mass or less, more preferably 15 parts by mass or less, and further preferably 10 parts by mass or less, from the viewpoints of abrasion resistance and initial wet grip performance.

The softening point of the adhesive resin is preferably 160° C. or lower, more preferably 145° C. or lower, and further preferably 125° C. or lower, from the viewpoint of good grip performance. Furthermore, the softening point is preferably 0° C. or higher, more preferably 20° C. or higher, and further preferably 30° C. or higher, from the viewpoint of good grip performance. In addition, in the present embodiment, the softening point is a temperature at which a sphere drops when the softening point specified in JIS K 6220-1: 2001 is measured with a ring and ball softening point measuring device. Moreover, Koresin (softening point: 145° C., manufactured by BASF), which is preferably used in racing tires, has good grip performance, but easily causes a problem of strong adhesion with equipment. However, this branched alkane exhibits a good mold releasability.

The glass transition temperature (Tg) of the adhesive resin is preferably 110° C. or lower, more preferably 105° C. or lower, and further preferably 100° C. or lower, from the viewpoint of good compatibility with the rubber component. Furthermore, it is preferably −35° C. or higher, more preferably 0° C. or higher, and further preferably 30° C. or higher, from the viewpoint of good compatibility with the rubber component.

The weight-average molecular weight (Mw) of the adhesive resin is preferably 300 or more, more preferably 400 or more, and further preferably 500 or more, from the viewpoints of less tendency to volatilization and a good grip performance. Furthermore, the Mw is preferably 15,000 or less, more preferably 13,000 or less, and further preferably 11,000 or less.

The SP value of the adhesive resin is preferably in the range of 8.0 to 11.0, and more preferably in the range of 8.5 to 10.0. In addition, in the present specification, the SP value means a solubility parameter calculated by the Hoy method based on a structure of a compound, indicating that the more the SP values of the two compounds depart from each other, the lower the compatibility is. When a resin having a SP value within the above-described ranges is used, its compatibility with the SBR and BR improves, and the abrasion resistance and breaking elongation can be improved.

<Surfactant>

The rubber composition according to the present embodiment may contain a surfactant. The surfactant that can be used in the present embodiment is not particularly limited, and a pluronic nonionic surfactant, a chain ethylene oxide, a compound represented by the formula (2) which will be described later, and the like are appropriately used. These surfactants may be used alone, or two or more thereof may be used in combination.

The pluronic nonionic surfactant is also referred to as a polyoxyethylene polyoxypropylene glycol, a polyoxyethylene polyoxypropylene block polymer, and a polypropylene glycol ethylene oxide adducts and is generally a nonionic surfactant represented by the following formula (2). As represented by the following formula (2), the pluronic nonionic surfactant has hydrophilic groups composed of ethylene oxide structures on both sides and a hydrophobic group composed of a propylene oxide structure so as to be sandwiched between the hydrophilic groups:

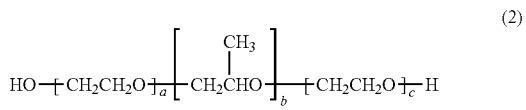

(2)

wherein a, b, and c represent an integer.

The degree of polymerization of the polypropylene oxide block of the pluronic nonionic surfactant (b in the formula (2) above) and the amount of polyethylene oxide added (a+c in the formula (2) above) are not particularly limited. They can be appropriately selected depending on the use conditions and purposes. The higher the proportion of the polypropylene oxide block is, the higher the affinity with the rubber tends to be and the slower the transfer rate to the rubber surface tends to be. The degree of polymerization of the polypropylene oxide block (b in the formula (2) above) is preferably 100 or less, and more preferably 10 to 70, from the viewpoint that the bloom of the nonionic surfactant can be appropriately controlled. The amount of polyethylene oxide added (a+c in the formula (2) above) is preferably 100 or less, more preferably 3 to 65. When the degree of polymerization of the polypropylene oxide block and the amount of polyethylene oxide added are within the above-described ranges, the bloom of the nonionic surfactant can be appropriately controlled in the rubber composition.

Examples of the pluronic nonionic surfactant include those manufactured and sold by BASF Japan Ltd., Sanyo Chemical Industries, Ltd., ADEKA Corporation, DKS Co. Ltd., NOF CORPORATION, etc.

The pluronic nonionic surfactant may bleed within about 2 to 3 days after vulcanization and accelerate bleeding of an antioxidant such as a phenylenediamine-based agent. Therefore, such surfactant may play a complementary role, for example, until a film is formed by wax including the above-described branched alkanes and the like. In addition, such surfactant may dissolve a non-polar linear alkane wax. Furthermore, such surfactant may penetrate the linear alkane wax and soften the coating obtained, making it difficult to be cracked. Therefore, by containing such surfactant, the rubber composition may improve in dynamic ozone performance.

Specific examples of a linear ethylene oxide include 50HB-100, 50HB-2000 manufactured by Sanyo Chemical Industries, Ltd., and the like.

Furthermore, the rubber composition for a tread according to the present embodiment may contain a compound represented by the following formula (3) as a surfactant:

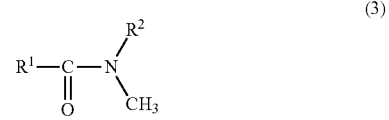

(3)

wherein, $R^1$ represents a C8-C14 linear, branched, or cyclic alkyl or alkenyl, and $R^2$ represents hydroxyalkyl or hydroxyalkyl having an oxyalkylene unit.

When the rubber composition contains such compound, the surface of the filler is covered with this compound, and aggregation of the fillers may be suppressed. In addition, the viscosity of the rubber composition may be reduced and the dispersibility of the filler may improve. As a result, the rubber composition may improve in the processability, fuel efficiency, and abrasion resistance.

Specific examples of the compound represented by the formula (3) include, for example, a coconut oil fatty acid N-methylethanolamide, a palm kernel oil fatty acid N-methylethanolamide, a lauric acid N-methylethanolamide, and the like.

When the rubber composition comprises the surfactant, the content thereof is preferably 0.1 parts by mass or more, and more preferably 0.3 parts by mass or more based on 100 parts by mass of the rubber component. Furthermore, the content is preferably 5.0 parts by mass or less, and more preferably 4.0 parts by mass or less. When the content of surfactant is within the above-described ranges, the rubber composition is good in steering stability, crack resistance, ozone resistance and discoloration resistance.

<Filler>

The rubber composition for a tread according to the present embodiment preferably comprises carbon black and silica as fillers.

(Carbon Black)

As carbon black, those generally used in the rubber industry can be appropriately utilized. Examples of carbon black include furnace black, acetylene black, thermal black, channel black, graphite and the like, and specifically N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, etc. can be appropriately used, and own company's synthetic products other than the above-described carbon blacks can be also appropriately used. These carbon blacks may be used alone, or two or more thereof may be used in combination.

The nitrogen adsorption specific surface area ($N_2SA$) of carbon black is preferably 40 $m^2/g$ or more, and more preferably 60 $m^2/g$ or more, from the viewpoint of durability. The upper limit of $N_2SA$ of carbon black is not particularly limited, but preferably 300 $m^2/g$ or less, more preferably 200 $m^2/g$ or less, and further preferably 150 $m^2/g$ or less, from the viewpoint of processability. In addition, the $N_2SA$ of carbon black is a value measured according to JIS K 6217-2 "Carbon black for rubber industry-Fundamental characteristics-Part 2: Determination of specific surface area-Nitrogen adsorption methods-Single-point procedures".

When the rubber composition comprises the carbon black, the content thereof is, from the viewpoint of ultraviolet crack, preferably 3 parts by mass or more, more preferably 4 parts by mass or more, and further preferably 5 parts by mass or more based on 100 parts by mass of the rubber component. Furthermore, the upper limit of the content of carbon black is not particularly limited, but preferably 100 parts by mass or less, more preferably 80 parts by mass or less, and further preferably 60 parts by mass or less, from the viewpoints of fuel efficiency and wet grip performance.

(Silica)

Silica is not particular limited, and those which are common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. Silica may be used alone, or two or more thereof may be used in combination.

The nitrogen adsorption specific surface area ($N_2SA$) of silica is preferably 20 $m^2/g$ or more, and more preferably 30 $m^2/g$ or more, from the viewpoint of obtaining sufficient reinforcing property. Furthermore, it is preferably 300 $m^2/g$ or less, and more preferably 250 $m^2/g$ or less, from the viewpoints of fuel efficiency and processability. In addition, the BET specific surface area of silica in the present specification is a value measured by a BET method according to ASTM D3037-93.

When the rubber composition comprises the silica, the content thereof is, from the viewpoint of wet grip performance, preferably 30 parts by mass or more, more preferably 35 parts by mass or more, and further preferably 40 parts by mass or more based on 100 parts by mass of the rubber component. Furthermore, it is preferably 100 parts by mass or less, more preferably 90 parts by mass or less, and further preferably 80 parts by mass or less, from the viewpoint of tan δ at 30° C.

The total content of silica and carbon black based on 100 parts by mass of the rubber component is preferably 40 parts by mass or more, more preferably 45 parts by mass or more, and further preferably 50 parts by mass or more, from the viewpoint of abrasion resistance. Furthermore, it is preferably 110 parts by mass or less, more preferably 100 parts by mass or less, and further preferably 90 parts by mass or less, from the viewpoints of tan δ at 30° C. and breaking strength (TB).

(Silane Coupling Agent)

Silica is preferably used in combination with a silane coupling agent. The silane coupling agent is not particularly limited, and any silane coupling agent conventionally used in combination with silica in the rubber industry can be used. Specific examples of the silane coupling agent include, for example, silane coupling agents having a sulfide group such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, and 3-trimethoxysilylpropylmethacrylatemonosulfide; silane coupling agents having a mercapto group such as 3-mercaptopropyltrimethoxysilane, 3-mercaptopropyltriethoxysilane, 2-mercaptoethyltrimethoxysilane, 2-mercaptoethyltriethoxysilane, and Si363; silane coupling agents having a thioester group such as 3-octanoylthio-1-propyltriethoxysilane, 3-hexanoylthio-1-propyltriethoxysilane, and 3-octanoylthio-1-propyltrimethoxysilane; silane coupling agents having a vinyl group such as vinyltriethoxysilane; silane coupling agents having an amino group such as 3-aminopropyltriethoxysilane; silane coupling agents having a glycidoxy group such as γ-glycidoxypropyltriethoxysilane; silane coupling agents having a nitro group such as 3-nitropropyltrimethoxysilane; and silane coupling agents having a chloro group such as 3-chloropropyltrimethoxysilane, and the like. Among them, silane coupling agents having a sulfide group, silane coupling agents having a mercapto group, and silane coupling agents having a thioester group are preferable. These silane coupling agents may be used alone, or two or more thereof may be used in combination.

When the rubber composition comprises the silane coupling agent, the content thereof is preferably 1 part by mass or more, more preferably 3 parts by mass or more, and further preferably 4 parts by mass or more based on 100 parts by mass of silica. Furthermore, the total content of silane coupling agents is preferably 20 parts by mass or less, more preferably 15 parts by mass or less, and further preferably 10 parts by mass or less, based on 100 parts by mass of silica. When the total content of silane coupling agents is within the above-described ranges, better processability, rubber strength, fuel efficiency, and abrasion resistance tend to be obtained.

(Other Fillers)

As a filler, other fillers may be also used in addition to carbon black and silica. Such filler is not particularly limited, and any fillers generally used in this field such as, for example, aluminum hydroxide, alumina (aluminum oxide), calcium carbonate, magnesium sulfate, talc, and clay can be used. These fillers may be used alone, or two or more thereof may be used in combination.

The total content of fillers based on 100 parts by mass of the rubber component is preferably 40 parts by mass or more, more preferably 45 parts by mass or more, and further preferably 50 parts by mass or more. Furthermore, the content is preferably 130 parts by mass or less, more preferably 120 parts by mass or less, and further preferably 110 parts by mass or less.

The content of silica in the filler is preferably 50% by mass or more, more preferably 70% by mass or more, and further preferably 80% by mass or more, form the viewpoints of fuel efficiency and wet grip performance.

<Other Components>

The rubber composition for a tread according to the present embodiment may appropriately comprise compounding agents and additives conventionally used in the tire industry, for example, a softening agent other than the above-described resin components, an antioxidant, a stearic acid, a zinc oxide, a vulcanizing agents such as sulfur, a vulcanization accelerators and the like as necessary, in addition to the above-described rubber components, alkane components, resin components, surfactants, and fillers.

The softening agent other than the resin components is not particularly limited, as long as it its common in the rubber industry, and examples of the softening agent include, for example, a liquid polymer, a process oil, and the like.

Examples of the process oil include, for example, a paraffin-based process oil, an aroma-based process oil, a naphthene-based process oil, a castor oil (for vulcanizing bladder) and the like. The process oil may be used alone, or two or more thereof may be used in combination.

When the rubber composition comprises the process oil, the content thereof is, from the viewpoints of little influence on mold releasability, and plasticization of the rubber and improvement in filler dispersion, preferably 1 part by mass or more, more preferably 3 parts by mass or more, and further preferably 5 parts by mass or more based on 100 parts by mass of the rubber component. Furthermore. it is preferably 40 parts by mass or less, more preferably 30 parts by mass or less, and further preferably 25 parts by mass or less, from the viewpoint that a large amount of adhesive resin can be compounded.

When the rubber composition for a tread according to the present embodiment contains a fatty acid, particularly stearic acid, the processing viscosity may be reduced and the vulcanization rate may be moderately secured. Furthermore, in the rubber composition, when zinc stearate bonded with zinc oxide blooms on the rubber surface, the slipperiness improves, and suppression of the mold contamination and improvement in the dispersibility of zinc oxide can be expected. Moreover, when stearic acid and a specific mold releasing agent are used in combination, the rubber composition easily obtains effects of processability, vulcanization rate, tire performance, and suppression of the mold contamination.

When the rubber composition comprises a stearic acid, the content thereof is, from the viewpoints of crosslinking density and processability, preferably 0.5 parts by mass or more, and more preferably 1 part by mass or more based on 100 parts by mass of the rubber component. Furthermore, it is preferably 8 parts by mass or less, and more preferably 5 parts by mass or less, from the viewpoints of deteriorated tensile strength and vulcanization rate.

Examples of the mold releasing agent include, for example, a fatty acid amide, a fatty acid amide ester, a fatty acid metal salt, and a mixtures thereof, etc. Examples of metal in the fatty acid metal salt include calcium, zinc, potassium, sodium, and the like. Among them, a fatty acid calcium salt is preferable from the viewpoints of being inexpensive, not causing environmental pollution, and not affecting the vulcanization rate. Furthermore, a fatty acid zinc can be a raw rubber that does not easily come into excessive contact with the mold without deteriorating the molding adhesiveness and may suppress the mold contamination. Specific examples of the fatty acid metal salt include, for example, zinc stearate, a zinc fatty acid, a specific mold releasing agent, and the like. Examples of the fatty acid amide include, for example, a stearic acid amide, an oleic acid amide, an erucic acid amide, and the like.

Examples of the antioxidant include, for example, a quinoline-based antioxidant, a quinone-based antioxidant, a phenol-based antioxidant, a phenylenediamine-based antioxidant, and the like. Among them, the phenylenediamine-based antioxidant is preferable from the viewpoint of being effective in both ozone resistance and oxidation. The antioxidant may be used alone, or two or more thereof may be used in combination.

When the rubber composition comprises the antioxidant, the content thereof is preferably 0.1 parts by mass or more, and more preferably 0.5 parts by mass or more based on 100 parts by mass of the rubber component. Furthermore, the content is preferably 10 parts by mass or less, and more preferably 7 parts by mass or less. When the content of the antioxidant is within the above-described ranges, the filler improves in oxidative deterioration resistance and is likely to exhibit a good tensile property. Moreover, the rubber composition obtained is easily kneaded. In this embodiment, the antioxidant has a slower bleeding speed than wax including the above-described branched alkanes and the like. However, when the rubber composition comprises 2 parts by mass or more of antioxidant based on 100 parts by mass of the rubber component, the bleeding rate increases and the static ozone performance may improve even immediately after the production.

When the rubber composition comprises a zinc oxide, the content thereof is, from the viewpoints of increasing vulcanization rate of the rubber and productivity of the tire, preferably 0.5 parts by mass or more, and more preferably 1 part by mass or more based on 100 parts by mass of the rubber component. Furthermore, it is preferably 8 parts by mass or less, and more preferably 5 parts by mass or less, from the viewpoint of preventing deterioration of abrasion resistance.

The content of sulfur when contained as a vulcanizing agent based on 100 parts by mass of the rubber component is preferably 0.5 parts by mass or more, and more preferably 1.0 part by mass or more, from the viewpoints of securing a sufficient vulcanization reaction and obtaining a good grip performance and abrasion resistance. Furthermore, it is preferably 3.0 parts by mass or less, and more preferably 2.5 parts by mass or less, for suppressing reduction in the grip performance and abrasion resistance due to blooming.

Examples of the vulcanization accelerator include, for example, a sulfenamide-based, a thiazole-based, a thiuram-based, a thiourea-based, a guanidine-based, a dithiocarbamic acid-based, an aldehyde-amine or an aldehyde-ammonia-based, an imidazoline-based, or a xanthate-based vulcanization accelerator. These vulcanization accelerators may be used alone, or two or more thereof may be used in combination. Among them, the sulfenamide-based vulcanization accelerator is preferable because of its good vulcanization characteristics and fuel efficiency in the physical properties of the rubber after vulcanization, and includes, for example, N-tert-butyl-2-benzothiazolyl sulfenamide (TBBS), N-cyclohexyl-2-benzothiazolyl sulfenamide (CZ), N,N'-dicyclohexyl-2-benzothiazolyl sulfenamide (DZ), and the like.

When the rubber composition comprises the vulcanization accelerator, the content thereof is, from the viewpoint of vulcanization acceleration, preferably 0.1 parts by mass or more, and more preferably 0.5 parts by mass or more based on 100 parts by mass of the rubber component. Furthermore, it is preferably 5 parts by mass or less, and more preferably 4 parts by mass or less, from the viewpoint of processability.

<Method of Producing Rubber Composition>

The rubber composition for a tread according to the present embodiment can be produced by a known method. For example, it can be produced by kneading each component described above by use of a rubber kneading apparatus such as a Banbury mixer and a sealed type kneader and then vulcanizing it. The rubber composition can be appropriately used for a tire tread.

The tire according to the present embodiment can be manufactured by a usual method using the above-described rubber composition. That is, the tire can be manufactured by attaching a member, in which an unvulcanized rubber composition obtained by kneading each of the above-described components was extruded in accordance with a shape of a tire member such as a tread, together with other tire members on a tire forming machine, and molding them in a usual manner, thereby forming an unvulcanized tire, followed by heating and pressurizing this unvulcanized tire in a vulcanizing machine.

EXAMPLE

The present invention will be specifically described based on examples. The present invention is not limited to these examples.

<Production of Terminal Modifying Agent>

Under a nitrogen atmosphere, 20.8 g of 3-(N,N-dimethylamino)propyltrimethoxysilane was placed in a 250 mL volumetric flask, and anhydrous hexane was further added to produce a total volume of 250 mL.

<Manufacturing Example 1 of Copolymer>

N-hexane (18 L), styrene (540 g), butadiene (1,460 g), and tetramethylethylenediamine (17 mmol) were added to a sufficiently nitrogen-substituted 30 L pressure-resistant container, and the temperature was raised to 40° C. Next, a 0.4 mol/L of silicon tetrachloride/hexane solution (3.5 mL) was added and stirred for 30 minutes. Next, butyllithium (10.5 mL) was added, then the temperature was raised to 50° C., and the mixture was stirred for 3 hours. Next, 30 mL of the above-described terminal modifying agent was added and stirred for 30 minutes. After adding a solution of 2,6-tert-butyl-p-cresol (0.2 g) in methanol (2 mL) to a reaction solution, the reaction solution was placed in a stainless steel container containing 18 L of methanol to recover aggregates. The obtained aggregates were dried under reduced pressure for 24 hours to obtain a silica-modified SBR.

<Manufacturing Example 2 of Copolymer>

N-hexane (18 L), styrene (740 g), butadiene (1,260 g), and tetramethylethylenediamine (17 mmol) were added to a sufficiently nitrogen-substituted 30 L pressure-resistant container, and the temperature was raised to 40° C. Next, a 0.4 mol/L of silicon tetrachloride/hexane solution (3.5 mL) was added and stirred for 30 minutes. Next, butyllithium (10.5 mL) was added, then the temperature was raised to 50° C., and the mixture was stirred for 3 hours. Next, 30 mL of the above-described terminal modifying agent was added and stirred for 30 minutes. After adding a solution of 2,6-tert-butyl-p-cresol (0.2 g) in methanol (2 mL) to a reaction solution, the reaction solution was placed in a stainless steel container containing 18 L of methanol to recover aggregates. The obtained aggregates were dried under reduced pressure for 24 hours to obtain a silica-modified SBR.

<Manufacturing Example 3 of Copolymer>

Cyclohexane (18 L), butadiene (2,000 g), and diethyl ether (53 mmol) were added to a sufficiently nitrogen-substituted 30 L pressure-resistant container, and the temperature was raised to 60° C. Next, butyllithium (16.6 mL) was added and then stirred for 3 hours. Next, 0.4 mol/L of silicon tetrachloride/hexane solution (12 mL) was added and stirred for 30 minutes. Next, the above-described terminal modifying agent (13 mL) was added and stirred for 30 minutes. After adding a solution of 2,6-tert-butyl-p-cresol (0.2 g) in methanol (2 mL) to a reaction solution, the reaction solution was placed in a stainless steel container containing 18 L of methanol to recover aggregates. The obtained aggregates were dried under reduced pressure for 24 hours to obtain a silica-modified BR.

Various chemicals used in Examples and Comparative examples are shown below.

(Rubber Component)

Silica-modified SBR 1: Modified SBR produced in Manufacturing example 1 of copolymer (amount of bonded styrene: 27% by mass, vinyl content: 53 mol %, Mw: 400,000)

Silica-modified SBR 2: Modified SBR produced in Manufacturing example 2 of copolymer (amount of bonded styrene: 37% by mass, vinyl content: 54 mol %, Mw: 410,000)

Silica-modified BR: Modified BR produced in Manufacturing example 3 of copolymer (cis content: 38% by mass, vinyl content: 13% by mass, Mw: 420,000)

BR: CB25 manufactured by LANXESS (BR synthesized using a Nd-based catalyst (a Nd-based BR), cis content: 97% by mass, vinyl content: 0.7% by mass, Mw: 500,000)

(Wax)

Paraffin: OZOACE 355 manufactured by Nippon Seiro Co., Ltd. (C40-C70 branched alkane: 8.3% by mass, C20-C32 linear alkane: 50.5% by mass, C45 or more linear alkane: 3.7% by mass, melting point: 70° C.)

Microcrystalline 1: Hi-Mic 1080 manufactured by Nippon Seiro Co., Ltd. (C40-C70 branched alkane: 47.0% by mass, C20-C32 linear alkane: 4.9% by mass, C45 or more linear alkane: 28.0 mass %, melting point: 84° C.)

Microcrystalline 2: Hi-Mic 1070 manufactured by Nippon Seiro Co., Ltd. (C40-C70 branched alkane: 53.8% by mass, C20-C32 linear alkane: 4.9% by mass, C45 or more linear alkane: 21.9% by mass, melting point: 80° C.)

Microcrystalline 3: Hi-Mic 1045 manufactured by Nippon Seiro Co., Ltd. (C40-C70 branched alkane: 63.9% by mass, C20-C32 linear alkane: 6.0% by mass, C45 or more linear alkane: 9.5% by mass, melting point: 72° C.)

(Filler)

Carbon black: Show Black N220 manufactured by Cabot Japan K.K. ($N_2SA$: 114 $m^2/g$)

Silica: ULTRASIL VN3 manufactured by Evonik Degussa GmbH (BET: 175 $m^2/g$)

Silane coupling agent 1: Si75 manufactured by Evonik Degussa GmbH (bis(3-triethoxysilylpropyl)disulfide)

Silane coupling agent 2: Si363 manufactured by Evonik Degussa GmbH (Hydrocarbon Resin)

Hydrocarbon resin 1: YS resin TO125 manufactured by Yasuhara Chemical Co., Ltd. (terpene styrene resin, softening point: 125° C., Tg: 64° C., SP value: 8.73, Mw: 800)

Hydrocarbon resin 2: Sylvatraxx 4401 manufactured by Arizona Chemical Company (α-methylstyrene resin, softening point: 85° C., Tg: 43° C., SP value: 9.1, Mw: 700)

Figure 1:
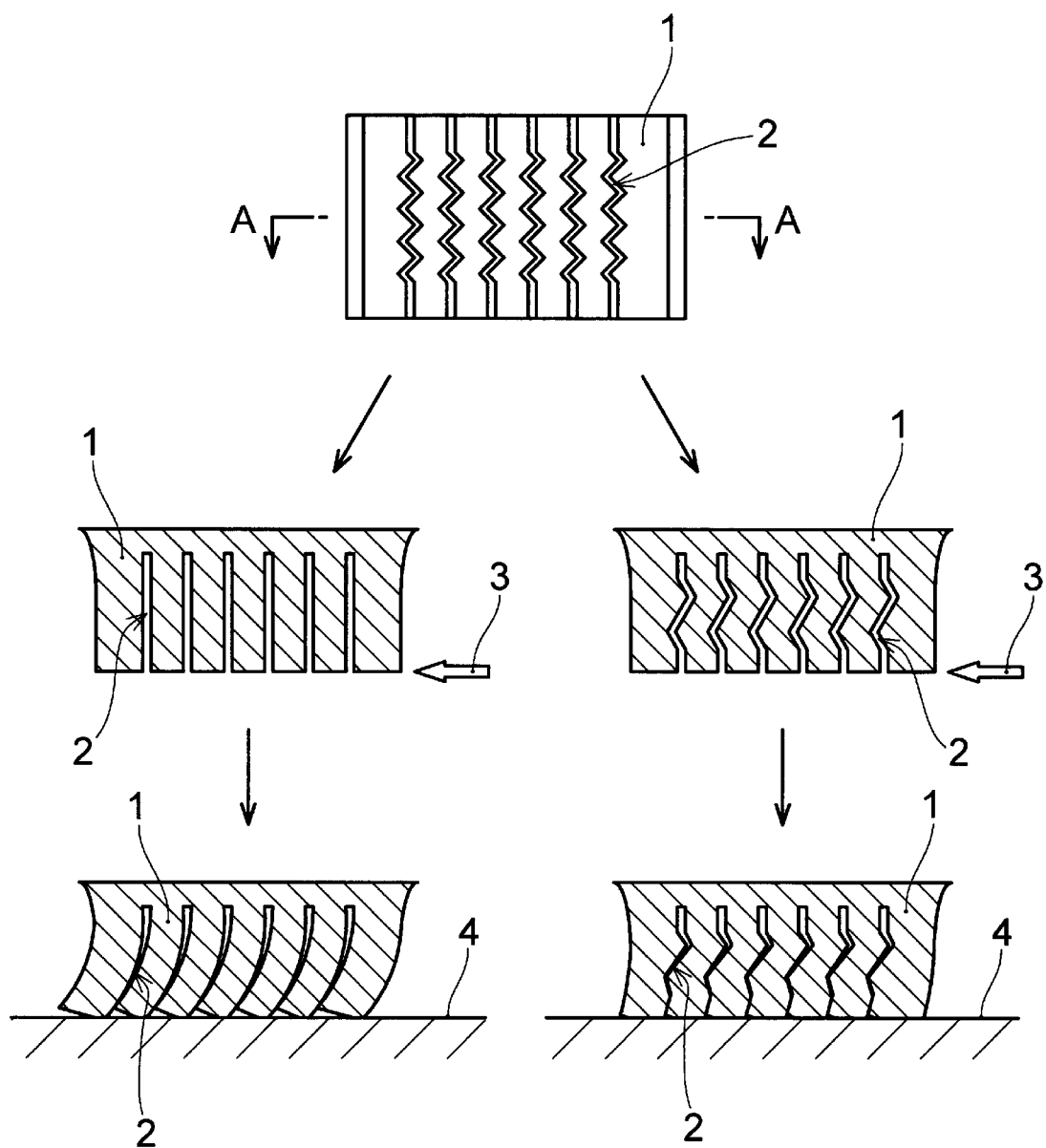
FIG. 1 is a plan view and a cross-sectional view schematically showing that a block rigidity differs due to difference in shape of a sipe provided on a tire, for example, allowing for improvement in gripping force by adopting a three-dimensional shape.
Figure 2:
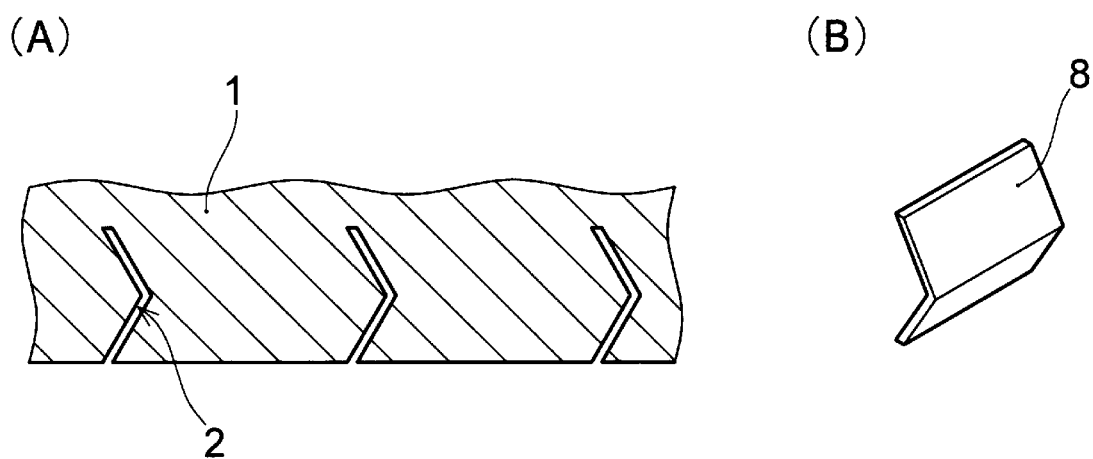
FIG. 2 is a schematic view of a cross section of a bent type sipe (A) and a perspective view of a blade of a vulcanization mold (B).
Figure 3:
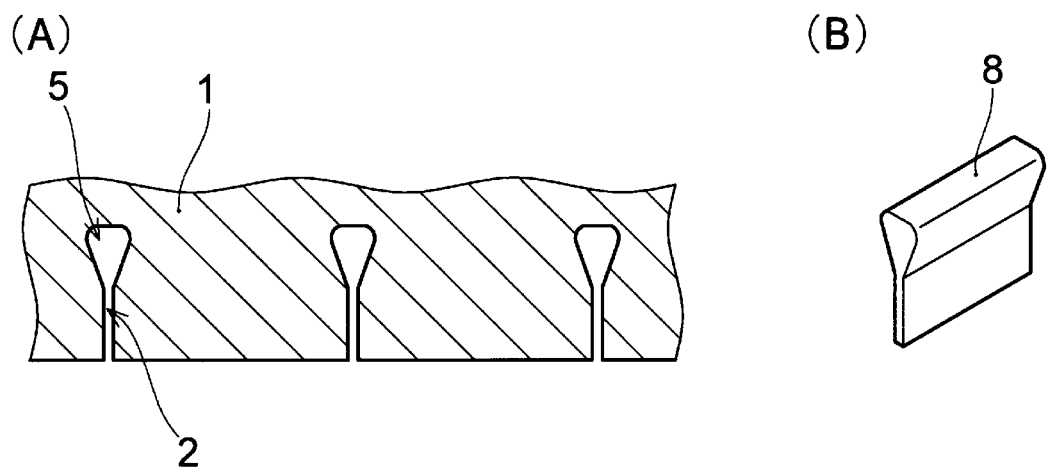
FIG. 3 is a schematic view of a cross section of a flask type sipe (A) and a perspective view of a blade of a vulcanization mold (B).
Figure 4:
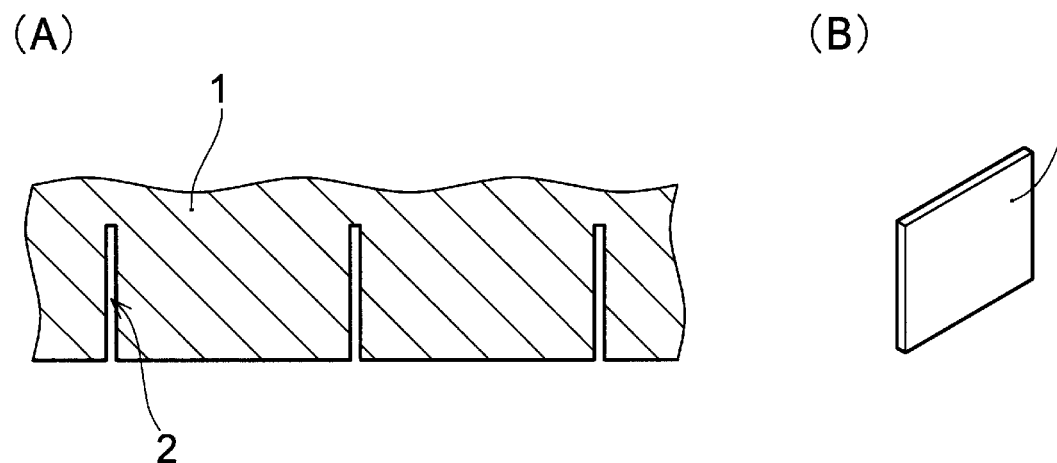
FIG. 4 is a schematic view of a cross section of a linear sipe (A) and a perspective view of a blade of a vulcanization mold (B).

(Surfactant)
  Surfactant 1: NEWPOL PE-64 manufactured by Sanyo Chemical Industries, Ltd. (pluronic nonionic surfactant, SP value: 9.2)
  Surfactant 2: 50HB-100 manufactured by Sanyo Chemical Industries, Ltd. (chain ethylene oxide, polyoxyethylene polyoxypropylene butyl ether, EO average addition molar number: 5, PO average addition molar number: 5, SP value: 9.5)
(Others)
  Stearic acid: Stearic acid "CAMELLIA" manufactured by NOF CORPORATION (melting point 53° C., SP value: 9.1)
  Processing aid 1: EF44 manufactured by Struktol Company of America (fatty acid zinc)
  Processing aid 2: WB16 manufactured by Struktol Company of America (fatty acid calcium salt, mixture of fatty acid monoethanolamide and fatty acid monoethanolamide ester, transparent melting point: 101° C., SP value: 10.0)
  Process oil: Diana Process AH-24 manufactured by Idemitsu Kosan Co., Ltd.
  Antioxidant 1: Antigen 6C manufactured by Sumitomo Chemical Co., Ltd. (N-phenyl-N'-(1,3-dimethylbutyl)-p-phenylenediamine)
  Antioxidant 2: Nocrac 224 manufactured by OUCHI SHINKO CHEMICAL INDUSTRIAL CO., LTD. (2,2,4-trimethyl-1,2-dihydroquinoline polymer)
  Zinc oxide: Zinc flower, Type II, specific gravity 5.6
  Sulfur: HK-200-5 manufactured by Hosoi Chemical Industry Co., Ltd. (oil content 5% by mass)
  Vulcanization accelerator 1: Nocceler NS-G manufactured by OUCHI SHINKO CHEMICAL INDUSTRIAL CO., LTD. (TBBS, N-tert-butyl-2-benzothiazylsulfenamide)
  Vulcanization accelerator 2: Nocceler D manufactured by OUCHI SHINKO CHEMICAL INDUSTRIAL CO., LTD. (DPG, 1,3-diphenylguanidine)
(Sipe Shape)
  Three-dimensional bent type: spacing between sipes: 5 mm, sipe width: 1 mm, depth: 5 mm, bent by 300 in the center (FIG. 2)
  Flask type: spacing between sipes: 5 mm, sipe width: 1 mm, maximum width of inner groove: 4 mm, depth: 5 mm (FIG. 3)
  Linear type: spacing between sipes: 5 mm, sipe width: 1 mm, depth: 5 mm (FIG. 4)

EXAMPLES AND COMPARATIVE EXAMPLES

According to the formulations shown in Tables 1 and 2, chemicals other than sulfur and vulcanization accelerators were kneaded for 5 minutes at the discharge temperature of 160° C. using a 1.7 L closed Banbury mixer to obtain a kneaded product. Furthermore, the obtained kneaded product was kneaded again (remilled) for 4 minutes at the discharge temperature of 150° C. by the Banbury mixer. Next, using a biaxial open roll, sulfur and vulcanization accelerators were added to the obtained kneaded product and kneaded for 4 minutes to 105° C. to obtain an unvulcanized rubber composition. The obtained unvulcanized rubber composition was press-vulcanized at 170° C. for 12 minutes to produce a rubber composition for testing.

Furthermore, the unvulcanized rubber composition was extruded into a tread shape with an extruder equipped with a mouthpiece having a predetermined shape and attached together with other tire members to form an unvulcanized tire, followed by press-vulcanized for 12 minutes under the condition of 170° C. to produce a tire for testing. The obtained unvulcanized rubber composition, rubber composition for testing, and tire for testing were evaluated as follows. The results are shown in Tables 1 and 2.

<Fuel Efficiency>

Using a viscoelasticity spectrometer VES (manufactured by Iwamoto Seisakusyo Co., Ltd.), loss tangent (tan $\delta$ at 30° C.) of each rubber composition for testing was measured under conditions of temperature of 30° C., frequency of 10 Hz, initial strain of 10%, and dynamic strain of 2%. The results indicate that the smaller the tan $\delta$ is, the lower the rolling resistance is and the better the fuel efficiency is.

<Releasability Index>

About 100 raw rubbers were vulcanized (170° C., 12 minutes) with a tire mold having a predetermined rib pattern to manufacture each tire for testing (size: 195/65R15), and the incidence rate of tire chipping in the rib pattern was indexed. Usually, when a tire is removed from a mold at an acute pattern edge, a sipe bottom, or the like, rubber chipping occurs. The results were index-displayed with the releasability of Comparative Example 1 being 100. The results indicate that the larger the releasability index is, the better the releasability is. In addition, the performance target value is set to be 105 or more.

<Abrasion Resistance Index>

Each tire for testing was mounted on all wheels of an actual vehicle for testing (domestic FF vehicle, displacement: 2,000 cc) to make it run on a dry asphalt road surface for 8,000 km, and a groove depth of a tire tread part was measured to calculate a running distance when the groove depth of the tire tread part is reduced by 1 mm. Comparative example 1 was index-displayed as being 100 by the following equation. The results indicate that the larger the index is, the better the abrasion resistance is. In addition, the performance target value is set to be 100 or more.

(Abrasion resistance index)=(running distance when tire groove of each tire for testing is reduced by 1 mm)/(running distance when tire groove of Comparative example 1 is reduced by 1 mm)×100

<Wet Grip Performance Index>

Each tire for testing was mounted on all wheels of an actual vehicle for testing (domestic FF vehicle, displacement: 2,000 cc), and a braking distance from an initial speed of 100 km/h on a wet road surface was measured. Comparative example 1 was index-displayed as being 100 by the following equation. The results indicate that the larger the index is, the better the wet grip performance is. In addition, the performance target value is set to be 100 or more.

(Wet grip performance index)=(braking distance of tire of Comparative example 1)/(braking distance of each tire for testing)×100

TABLE 1

| | Example | | | | | | | | |
|---|---|---|---|---|---|---|---|---|---|
| | 1 | 2 | 3 | 4 | 5 | 6 | 7 | 8 | 9 |
| Compounding amount (part by mass) | | | | | | | | | |
| Silica-modified SBR 1 | 85 | 85 | 85 | 85 | 85 | 85 | 85 | 85 | 85 |
| Silica-modified SBR 2 | — | — | — | — | — | — | — | — | — |
| Silica-modified BR | 15 | 15 | 15 | 15 | 15 | 15 | 15 | 15 | — |
| BR | — | — | — | — | — | — | — | — | 15 |
| Carbon black | 5.0 | 5.0 | 5.0 | 5.0 | 5.0 | 5.0 | 5.0 | 5.0 | 5.0 |
| Silica | 55 | 55 | 55 | 55 | 55 | 55 | 55 | 55 | 55 |
| Silane coupling agent 1 | 4.4 | 4.4 | 4.4 | 4.4 | 4.4 | 4.4 | 4.4 | 4.4 | 4.4 |
| Silane coupling agent 2 | — | — | — | — | — | — | — | — | — |
| Paraffin | 1.5 | 1.5 | 1.5 | 1.5 | 0.5 | 1.0 | 0.5 | 0.5 | 1.5 |
| Microcrystalline 1 | 1.0 | — | — | 2.0 | 5.0 | 0.3 | 2.0 | — | 1.0 |
| Microcrystalline 2 | — | 1.0 | — | — | — | — | — | — | — |
| Microcrystalline 3 | — | — | 1.0 | — | — | — | — | 2.0 | — |
| (C40-C70 branched alkane) | 0.59 | 0.66 | 0.76 | 1.07 | 2.39 | 0.22 | 0.98 | 1.32 | 0.59 |
| (C20-C32 linear alkane) | 0.81 | 0.81 | 0.82 | 0.86 | 0.50 | 0.52 | 0.35 | 0.35 | 0.81 |
| (C45 or more linear alkane) | 0.34 | 0.27 | 0.15 | 0.62 | 1.42 | 0.12 | 0.58 | 0.46 | 0.34 |
| Hydrocarbon resin 1 | — | — | — | — | 3.0 | — | — | — | — |
| Hydrocarbon resin 2 | — | — | — | — | — | — | — | — | — |
| Surfactant | — | — | — | — | — | — | — | — | — |
| Stearic acid | 2.0 | 2.0 | 2.0 | 2.0 | 2.0 | 2.0 | 2.0 | 2.0 | 2.0 |
| Process oil | 15 | 15 | 15 | 15 | 7.0 | 15 | 15 | 15 | 15 |
| Antioxidant 1 | 2.0 | 2.0 | 2.0 | 2.0 | 2.0 | 2.0 | 2.0 | 2.0 | 2.0 |
| Antioxidant 2 | 1.0 | 1.0 | 1.0 | 1.0 | 1.0 | 1.0 | 1.0 | 1.0 | 1.0 |
| Zinc oxide | 2.0 | 2.0 | 2.0 | 2.0 | 2.0 | 2.0 | 2.0 | 2.0 | 2.0 |
| Sulfur | 1.5 | 1.5 | 1.5 | 1.5 | 1.5 | 1.5 | 1.5 | 1.5 | 1.5 |
| Vulcanization accelerator 1 | 1.8 | 1.8 | 1.8 | 1.8 | 1.8 | 1.8 | 1.8 | 1.8 | 1.8 |
| Vulcanization accelerator 2 | 2.0 | 2.0 | 2.0 | 2.0 | 2.0 | 2.0 | 2.0 | 2.0 | 2.0 |
| Sipe shape in radial direction of tire | Bent type | Bent type | Bent type | Bent type | Bent type | Bent type | Bent type | Bent type | Bent type |
| Index | | | | | | | | | |
| tan δ at 30° C. | 0.12 | 0.12 | 0.12 | 0.13 | 0.14 | 0.13 | 0.11 | 0.11 | 0.14 |
| Releasability | 115 | 117 | 118 | 120 | 130 | 106 | 120 | 122 | 125 |
| Abrasion resistance | 100 | 100 | 100 | 100 | 100 | 100 | 102 | 102 | 107 |
| Wet grip performance | 101 | 101 | 101 | 100 | 101 | 102 | 104 | 104 | 101 |

| | Example | | | | | | | | |
|---|---|---|---|---|---|---|---|---|---|
| | 10 | 11 | 12 | 13 | 14 | 15 | 16 | 17 | 18 |
| Compounding amount (part by mass) | | | | | | | | | |
| Silica-modified SBR 1 | — | 85 | 85 | 85 | 85 | 85 | 85 | 85 | 70 |
| Silica-modified SBR 2 | 85 | — | — | — | — | — | — | — | — |
| Silica-modified BR | 15 | 15 | 15 | 15 | 15 | 15 | 15 | 15 | 30 |
| BR | — | — | — | — | — | — | — | — | — |
| Carbon black | 5.0 | 5.0 | 5.0 | 5.0 | 5.0 | 5.0 | 5.0 | 5.0 | 5.0 |
| Silica | 55 | 70 | 70 | 70 | 55 | 55 | 75 | 55 | 90 |
| Silane coupling agent 1 | 4.4 | — | — | — | 4.4 | 4.4 | — | 4.4 | — |
| Silane coupling agent 2 | — | 5.6 | 5.6 | 5.6 | — | — | 6.0 | — | 7.2 |
| Paraffin | 1.5 | 1.5 | 1.5 | 1.5 | 1.5 | 1.5 | 1.5 | 1.0 | 1.5 |
| Microcrystalline 1 | 1.0 | 1.0 | 1.0 | 1.0 | 1.0 | 1.0 | 1.0 | 0.7 | 1.0 |
| Microcrystalline 2 | — | — | — | — | — | — | — | — | — |
| Microcrystalline 3 | — | — | — | — | — | — | — | — | — |
| (C40-C70 branched alkane) | 0.59 | 0.59 | 0.59 | 0.59 | 0.59 | 0.59 | 0.59 | 0.41 | 0.59 |
| (C20-C32 linear alkane) | 0.81 | 0.81 | 0.81 | 0.81 | 0.81 | 0.81 | 0.81 | 0.54 | 0.81 |
| (C45 or more linear alkane) | 0.34 | 0.34 | 0.34 | 0.34 | 0.34 | 0.34 | 0.34 | 0.23 | 0.34 |
| Hydrocarbon resin 1 | — | — | 7.0 | — | — | — | — | — | — |
| Hydrocarbon resin 2 | — | — | — | 7.0 | — | — | — | — | — |
| Surfactant | — | — | — | — | 2.0 | — | — | — | — |
| Stearic acid | 2.0 | 2.0 | 2.0 | 2.0 | 2.0 | 2.0 | 2.0 | 2.0 | 2.0 |
| Process oil | 15 | 22 | 15 | 15 | 13 | 15 | 25 | 15 | 40 |
| Antioxidant 1 | 2.0 | 2.0 | 2.0 | 2.0 | 2.0 | 2.0 | 2.0 | 2.0 | 2.0 |
| Antioxidant 2 | 1.0 | 1.0 | 1.0 | 1.0 | 1.0 | 1.0 | 1.0 | 1.0 | 1.0 |
| Zinc oxide | 2.0 | 2.0 | 2.0 | 2.0 | 2.0 | 2.0 | 2.0 | 2.0 | 2.0 |

TABLE 1-continued

| | | | | | | | | | |
|---|---|---|---|---|---|---|---|---|---|
| Sulfur | 1.5 | 1.5 | 1.5 | 1.5 | 1.5 | 1.5 | 1.5 | 1.5 | 1.5 |
| Vulcanization accelerator 1 | 1.8 | 1.8 | 1.8 | 1.8 | 1.8 | 1.8 | 1.8 | 1.8 | 1.8 |
| Vulcanization accelerator 2 | 2.0 | 2.0 | 2.0 | 2.0 | 2.0 | 2.0 | 2.0 | 2.0 | 2.0 |
| Sipe shape in radial direction of tire | Bent type | Bent type | Bent type | Bent type | Bent type | Flask type | Bent type | Bent type | Bent type |
| Index | | | | | | | | | |
| tan δ at 30° C. | 0.11 | 0.12 | 0.15 | 0.15 | 0.12 | 0.12 | 0.13 | 0.13 | 0.15 |
| Releasability | 111 | 125 | 128 | 109 | 117 | 108 | 122 | 115 | 124 |
| Abrasion resistance | 100 | 110 | 115 | 109 | 100 | 100 | 110 | 100 | 111 |
| Wet grip performance | 100 | 110 | 114 | 111 | 106 | 101 | 110 | 102 | 118 |

TABLE 2

| | Comparative Example | | | | | |
|---|---|---|---|---|---|---|
| | 1 | 2 | 3 | 4 | 5 | 6 |
| Compounding amount (part by mass) | | | | | | |
| Silica-modified SBR 1 | 85 | 85 | 85 | 85 | 85 | 85 |
| Silica-modified BR | 15 | 15 | 15 | 15 | 15 | 15 |
| Carbon black | 5.0 | 5.0 | 5.0 | 5.0 | 5.0 | 5.0 |
| Silica | 55 | 55 | 55 | 55 | 55 | 55 |
| Silane coupling agent 1 | 4.4 | 4.4 | 4.4 | 4.4 | 4.4 | 4.4 |
| Silane coupling agent 2 | — | — | — | — | — | — |
| Paraffin | 1.5 | 1.5 | 1.5 | 1.5 | 1.5 | 1.5 |
| Microcrystalline 1 | — | — | — | — | — | — |
| (C40-C70 branched alkane) | 0.12 | 0.12 | 0.12 | 0.12 | 0.12 | 0.12 |
| (C20-C32 linear alkane) | 0.76 | 0.76 | 0.76 | 0.76 | 0.76 | 0.76 |
| (C45 or more linear alkane) | 0.06 | 0.06 | 0.06 | 0.06 | 0.06 | 0.06 |
| Hydrocarbon resin 1 | — | — | — | — | — | — |
| Hydrocarbon resin 2 | — | — | — | — | — | — |
| Stearic acid | 2.0 | 2.0 | 2.0 | 2.0 | 2.0 | 2.0 |
| Processing aid 1 | — | — | — | — | — | 3.0 |
| Processing aid 2 | — | — | — | 1.0 | 3.0 | — |
| Process oil | 16 | 16 | 16 | 15 | 13 | 13 |
| Antioxidant 1 | 2.0 | 2.0 | 2.0 | 2.0 | 2.0 | 2.0 |
| Antioxidant 2 | 1.0 | 1.0 | 1.0 | 1.0 | 1.0 | 1.0 |
| Zinc oxide | 2.0 | 2.0 | 2.0 | 2.0 | 2.0 | 2.0 |
| Sulfur | 1.8 | 1.8 | 1.8 | 1.8 | 1.8 | 1.8 |
| Vulcanization accelerator 1 | 1.8 | 1.8 | 1.8 | 1.8 | 1.8 | 1.8 |
| Vulcanization accelerator 2 | 2.0 | 2.0 | 2.0 | 2.0 | 2.0 | 2.0 |
| Sipe shape in radial direction of tire | Bent type | Flask type | Linear type | Bent type | Bent type | Bent type |
| Index | | | | | | |
| tan δ at 30° C. | 0.12 | 0.12 | 0.12 | 0.13 | 0.16 | 0.16 |
| Releasability | 100 | 90 | 115 | 104 | 112 | 103 |
| Abrasion resistance | 100 | 97 | 92 | 96 | 92 | 95 |
| Wet grip performance | 100 | 100 | 90 | 97 | 91 | 92 |

| | Comparative Example | | | | | |
|---|---|---|---|---|---|---|
| | 7 | 8 | 9 | 10 | 11 | 12 |
| Compounding amount (part by mass) | | | | | | |
| Silica-modified SBR 1 | 85 | 85 | 85 | 85 | 85 | 85 |
| Silica-modified BR | 15 | 15 | 15 | 15 | 15 | 15 |
| Carbon black | 5.0 | 5.0 | 5.0 | 5.0 | 5.0 | 5.0 |
| Silica | 55 | 55 | 70 | 70 | 70 | 100 |
| Silane coupling agent 1 | 4.4 | 4.4 | 5.6 | — | — | — |
| Silane coupling agent 2 | — | — | — | 5.6 | 5.6 | 8.0 |
| Paraffin | 3.5 | 1.5 | 1.5 | 1.5 | 1.5 | 1.5 |
| Microcrystalline 1 | — | — | 1.0 | — | — | 1.0 |
| (C40-C70 branched alkane) | 0.29 | 0.12 | 0.59 | 0.12 | 0.12 | 0.59 |
| (C20-C32 linear alkane) | 1.77 | 0.76 | 0.81 | 0.76 | 0.76 | 0.81 |
| (C45 or more linear alkane) | 0.13 | 0.06 | 0.34 | 0.06 | 0.06 | 0.34 |
| Hydrocarbon resin 1 | — | — | — | 7.0 | — | 7.0 |
| Hydrocarbon resin 2 | — | — | — | — | 7.0 | — |
| Stearic acid | 2.0 | 4.0 | 2.0 | 2.0 | 2.0 | 2.0 |
| Processing aid 1 | — | — | — | — | — | — |
| Processing aid 2 | — | — | — | — | — | — |
| Process oil | 14 | 14 | 22 | 15 | 15 | 42 |
| Antioxidant 1 | 2.0 | 2.0 | 2.0 | 2.0 | 2.0 | 2.0 |
| Antioxidant 2 | 1.0 | 1.0 | 1.0 | 1.0 | 1.0 | 1.0 |
| Zinc oxide | 2.0 | 2.0 | 2.0 | 2.0 | 2.0 | 2.0 |
| Sulfur | 1.5 | 1.5 | 1.5 | 1.5 | 1.5 | 1.5 |
| Vulcanization accelerator 1 | 1.8 | 1.8 | 1.8 | 1.8 | 1.8 | 1.8 |
| Vulcanization accelerator 2 | 2.0 | 2.0 | 2.0 | 2.0 | 2.0 | 2.0 |
| Sipe shape in radial direction of tire | Bent type | Bent type | Bent type | Bent type | Bent type | Bent type |
| Index | | | | | | |
| tan δ at 30° C. | 0.13 | 0.14 | 0.17 | 0.15 | 0.15 | 0.19 |
| Releasability | 80 | 104 | 121 | 104 | 99 | 121 |
| Abrasion resistance | 97 | 97 | 102 | 115 | 109 | 100 |
| Wet grip performance | 90 | 94 | 108 | 113 | 110 | 120 |

From the results of Tables 1 and 2, it can be found that the tire of the present invention having the cap tread with the sipe with a three-dimensional shape or the like has a good mold releasability and maintained or improved abrasion resistance and wet grip performance.

EXPLANATION OF NUMERALS

1: Tire
2: Sipe
3: External force
4: Ground contact surface
5: Inner groove
6: Trimming
7: Shallow groove
8: Blade

The invention claimed is:

1. A tire comprising a cap tread,
wherein the cap tread is composed of a rubber composition comprising 0.30 to 3.0 parts by mass of C40-C70 branched alkane and 0.20 to 1.0 parts by mass of C20-C32 linear alkane based on 100 parts by mass of a rubber component and having 0.16 or less of tan δ at 30° C.,
wherein the rubber component comprises a butadiene rubber,
wherein the total content of silica and carbon black in the rubber composition is 40 to 110 parts by mass,
wherein the cap tread has a sipe with a three-dimensional shape or a sipe with a portion of a maximum cross-sectional area and a minimum cross sectional area inside a surface of the tread,
wherein the maximum cross-sectional area is 1.1 times or more the minimum cross-sectional area, and
wherein rubber composition further comprises 0.15 to 1.42 parts by mass of C45 or more linear alkane.

2. The tire of claim 1, wherein the tan δ at 30° C. of the rubber composition is 0.14 or less.

3. The tire of claim 1, wherein the rubber composition comprises 0.40 to 2.5 parts by mass of C40-C70 branched alkane.

4. The tire of claim 1, wherein the rubber composition comprises 7.0 parts by mass or more of process oil.

5. The tire of claim 1, wherein the rubber component comprises 60% by mass or more of styrene butadiene rubber.

6. The tire of claim 1, wherein the butadiene rubber has a content of cis-1,4 bond of less than 50%.

7. A tire comprising a cap tread,
wherein the cap tread is composed of a rubber composition comprising 0.30 to 3.0 parts by mass of C40-C70 branched alkane based on 100 parts by mass of a rubber component and having 0.16 or less of tan δ at 30° C.,
wherein the rubber composition comprises 20 parts by mass or less of a resin component,
wherein the rubber component comprises 70% to 85% by mass of styrene butadiene rubber,
wherein the total content of silica and carbon black in the rubber composition is 40 to 110 parts by mass,
wherein the cap tread has a sipe with a three-dimensional shape or a sipe with a portion of a maximum cross-sectional area and a portion of minimum cross sectional area inside a surface of the tread,
wherein a maximum cross-sectional area is 1.1 times or more the minimum cross-sectional area,
wherein the rubber component comprises 15 to 30% by mass of butadiene rubber, and
wherein the rubber composition further comprises 0.15 to 1.42 parts by mass of C45 or more linear alkane.

8. The tire of claim 7, wherein the tan δ at 30° C. of the rubber composition is 0.14 or less.

9. The tire of claim 7, wherein the rubber composition comprises 0.40 to 2.5 parts by mass of C40-C70 branched alkane.

10. The tire of claim 7, wherein the rubber composition comprises 0.20 to 1.0 parts by mass of C20-C32 linear alkane.

11. The tire of claim 7, wherein the rubber composition comprises 7.0 parts by mass or more of process oil.

12. The tire of claim 7, wherein the butadiene rubber has a content of cis-1,4 bond of less than 50%.

13. A tire comprising a cap tread,
wherein the cap tread is composed of a rubber composition comprising 0.30 to 3.0 parts by mass of C40-C70 branched alkane and 7.0 parts by mass or more of process oil based on 100 parts by mass of a rubber component and having 0.16 or less of tan δ at 30° C.,
wherein the rubber composition comprises 20 parts by mass or less of a resin component,
wherein the rubber component comprises a butadiene rubber,
wherein the total content of silica and carbon black in the rubber composition is 70 to 110 parts by mass,
wherein the cap tread has a sipe with a three-dimensional shape or a sipe with a portion of a maximum cross-sectional area and a portion of a minimum cross-sectional area inside a surface of the tread,
wherein a maximum cross-sectional area is 1.1 times or more the minimum cross-sectional area,
wherein the content of silica in the rubber composition is 70 to 100 parts by mass, and
wherein the rubber composition further comprises 0.15 to 1.42 parts by mass of C45 or more linear alkane.

14. The tire of claim 13, wherein the tan δ at 30° C. of the rubber composition is 0.14 or less.

15. The tire of claim 13, wherein the rubber composition comprises 0.40 to 2.5 parts by mass of C40-C70 branched alkane.

16. The tire of claim 13, wherein the rubber composition comprises 0.20 to 1.0 parts by mass of C20-C32 linear alkane.

17. The tire of claim 13, wherein the rubber component comprises 60% by mass or more of styrene butadiene rubber.

18. The tire of claim 13, wherein the butadiene rubber has a content of cis-1,4 bond of less than 50%.

\* \* \* \* \*